US011557884B2

(12) United States Patent
Cordero Lozano et al.

(10) Patent No.: US 11,557,884 B2
(45) Date of Patent: Jan. 17, 2023

(54) FIXTURE ALIGNER

(71) Applicant: International Business Machines Corporation, Armonk, NY (US)

(72) Inventors: Sergio Alberto Cordero Lozano, Tlajomulco de Zunoga (MX); Jesus Ernesto Ibarra Hernandez, Zapopan (MX); Oscar Eduardo Flores Pantoja, El Salto (MX)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 16/426,143

(22) Filed: May 30, 2019

(65) Prior Publication Data

US 2020/0381904 A1 Dec. 3, 2020

(51) Int. Cl.
*H02G 1/00* (2006.01)
(52) U.S. Cl.
CPC ..................................... *H02G 1/00* (2013.01)
(58) Field of Classification Search
CPC .. H02G 1/00; H02G 1/04; H02G 1/08; H02G 3/00; H02G 3/04; H02G 3/0431; H02G 3/0437; H02G 3/22; H02G 3/24; H02G 3/26; H02G 3/28; H02G 3/30
USPC .......... 174/68.1, 68.3, 480, 481, 137 R, 135, 174/72 A; 248/68.1, 49; 385/134, 135
See application file for complete search history.

(56) References Cited

U.S. PATENT DOCUMENTS

| 3,068,316 | A | * | 12/1962 | Witt | H02G 11/02 174/69 |
| 3,852,517 | A | * | 12/1974 | Fava | H01R 4/022 174/84 R |
| 5,619,569 | A | * | 4/1997 | McVay | H04M 1/15 379/438 |
| 6,683,252 | B2 | * | 1/2004 | Sobel | H05K 7/1409 174/135 |
| 8,039,750 | B2 | * | 10/2011 | Magnusson | H04M 1/6058 439/501 |
| 8,528,171 | B2 | * | 9/2013 | Walker | F16G 11/02 24/129 R |
| 8,793,842 | B2 | * | 8/2014 | Donovan | B65H 75/36 24/115 N |
| 2010/0040330 | A1 | * | 2/2010 | Riha | H04Q 1/136 385/53 |

(Continued)

FOREIGN PATENT DOCUMENTS

CN 109188611 A 1/2019
MX 2011004213 A 10/2011

*Primary Examiner* — Angel R Estrada
(74) *Attorney, Agent, or Firm* — Jared C. Chaney

(57) ABSTRACT

Aspects of the present disclosure relate to an apparatus for aligning a connector during engagement or disengagement from a port. In some embodiments the apparatus includes a sleeve, a channel in the sleeve, and a handle extending away from the sleeve. In some embodiments, the sleeve is designed to receive a cable connector with a first opening at a first end of the sleeve and a second opening at the second end of the sleeve, the sleeve designed to receive a cable connector through the first end and allow the cable connector to exit through the second end after the cable connector has been engaged to a port. In some embodiments, the channel extends a length of the sleeve from the first end to the second end.

20 Claims, 11 Drawing Sheets

(56) References Cited

U.S. PATENT DOCUMENTS

2010/0278497 A1\* 11/2010 Hsu ..................... G02B 6/3825
                                                                       385/134
2014/0305700 A1\* 10/2014 Mattson ................ H01B 11/00
                                                                       174/74 R
2014/0315414 A1    10/2014 Gao et al.

\* cited by examiner

FIXTURE ALIGNER

BACKGROUND

Aspects of the present disclosure relate to cables or cords, more particular aspects relate to cable connectors.

Electrical cords or cables and their connectors define physical parameters for the transfer and interpretation of signals. For some signals (digital audio and digital video), this can be thought of as defining the physical layer, data link layer, and most or all of the application layer. For analog audio and analog video these functions are all represented in a single signal specification or the direct speaker-driving signal of analog audio. Physical characteristics of the electrical or optical equipment includes the types and numbers of wires required, voltages, frequencies, optical intensity, and the physical design of the connectors.

BRIEF SUMMARY

The present disclosure provides an apparatus, a method, and a method of production of a fixture aligner. In some embodiments, the apparatus includes a sleeve configured to receive a cable connector, a first opening at a first end of the sleeve, a second opening at a second end of the sleeve. wherein the sleeve is designed to receive the cable connector through the first end and allow the cable connector to exit through the second end after the cable connector has been engaged to a port, a channel extending a length of the sleeve from the first end to the second end, designed to allow for a cord attached to the cable connector to pass through the channel, and a handle extending from the first end of the sleeve.

In some embodiments, the method includes placing a fixture aligner over a port, inserting a connector into the fixture aligner, engaging the connector with the port, and sliding the fixture aligner off of the connector away from the port.

In some embodiment, the method includes forming a sleeve designed to receive a cable connector with a first opening at a first end of the sleeve and a second opening at a second end of the sleeve, the sleeve designed to receive the cable connector through the first end and allow the cable connector to exit through the second end after the cable connector has been engaged to a port, establishing a channel in the sleeve extending a length of the sleeve from the first end to the second end, the channel designed to allow for a cord attached to the cable connector to pass through the channel, and forming a handle that extends from the first end of the sleeve.

DETAILED DESCRIPTION

Properly aligning and orienting cables when engaging (e.g., plugging in, connecting, attaching, etc.) and disengaging cable connectors can be challenging. Many cable connectors are damaged when attaching cables. As computer cables increase in complexity so does the possibility that one or more connection points on the connectors may become damaged if the connector is misaligned during connection. Misalignment can occur if the connecter is twisted when it is inserted or if the connector is inserted at an angle. Misalignment can cause parts, such as wires, prongs, or cards of the connector to become bent, broken, or cracked.

In some embodiments, a fixture aligner is used to facilitate inserting a connector into a computing device or removing the connector from the computing device. In some embodiments, connection devices may be described as a connector (e.g., plug) or a port (e.g., socket, connector, or any other construction able to receive a connector). For example, an ethernet cable ends in a connector and a computer may have an ethernet port. In some embodiments, the port may be on the back of a computing device, such as a computer server. Describing the connector on the end of a cable and the port on the back of a computer is meant as a descriptive example. The port may be on another cable, a server, a battery backup, or any other electronic device. Likewise, either the cable or the port may have protruding connectors or any other means of making an electronic, signal, or data connection.

Figure 1:
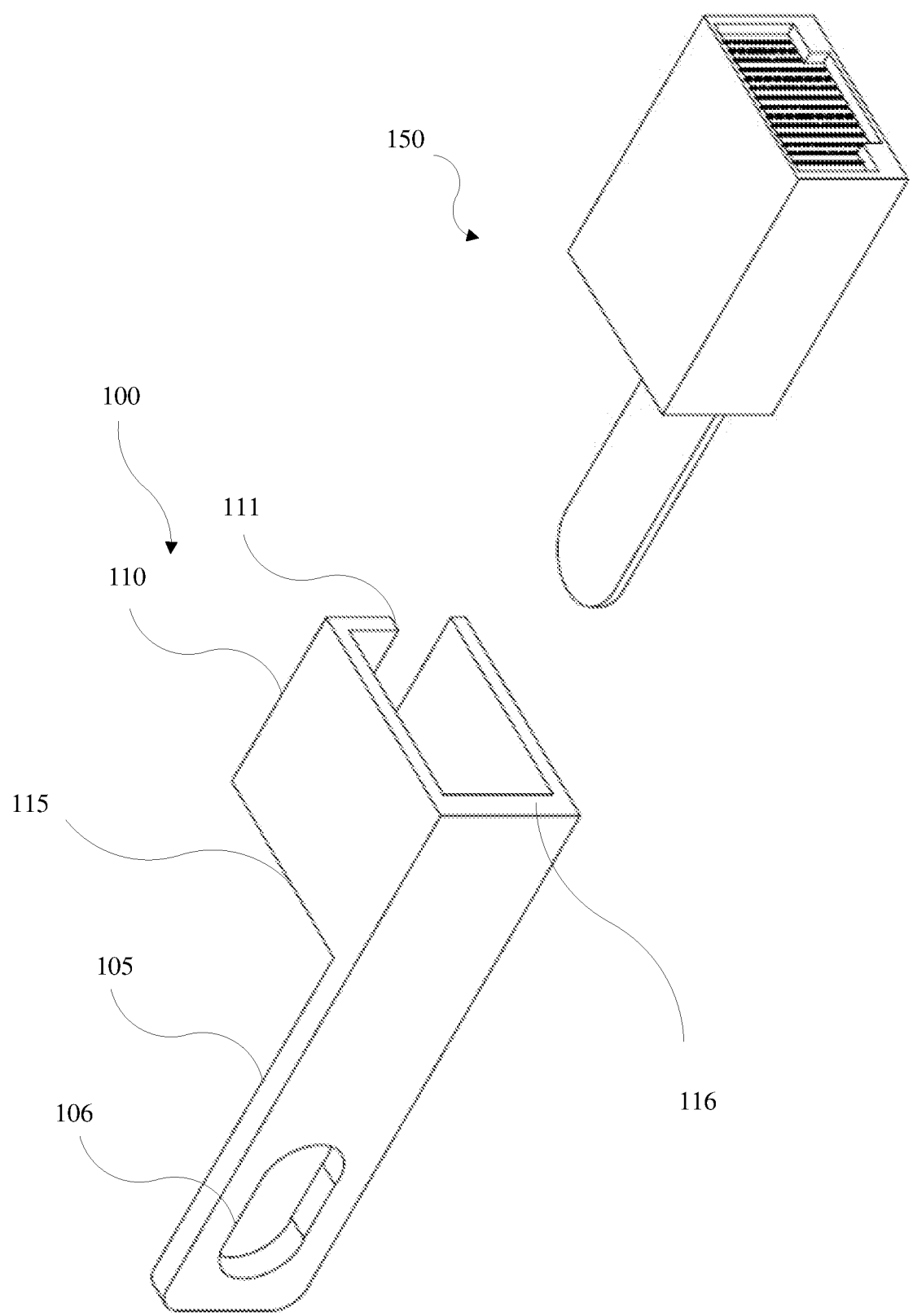
FIG. 1 is a diagram illustrating a fixture aligner and a connector.

FIG. 1 depicts an example fixture aligner 100 apparatus and an example connector 150. In some embodiments, fixture aligner 100 is designed such that connector 150 can slide through fixture aligner 100. In some embodiments, fixture aligner 100 is designed with a sleeve 110 designed to fit around connector 150. In some embodiments, sleeve 110 has a slit 111. Slit 111 may be designed to accommodate a cord (e.g., a ribbon cable, an either net cable, a power cord, etc.) connected to connector 150. For example, slit 111 can be designed to allow a ribbon cable attached to the side of connector 150 to slide through it. In some embodiments, sleeve 110 has a first end 115 and a second end 116.

In some embodiments, fixture aligner 100 has a handle 105. For example, handle 105 may be designed to be held by hand while using fixture aligner 100. In some embodiments handle 105 has grip augmentation feature 106. As illustrated, grip augmentation feature 106 takes the form of a hole, but in some embodiments grip augmentation feature 106 may take other forms. For example, a grip augmentation feature may be bumps or a coating.

Figure 2A:
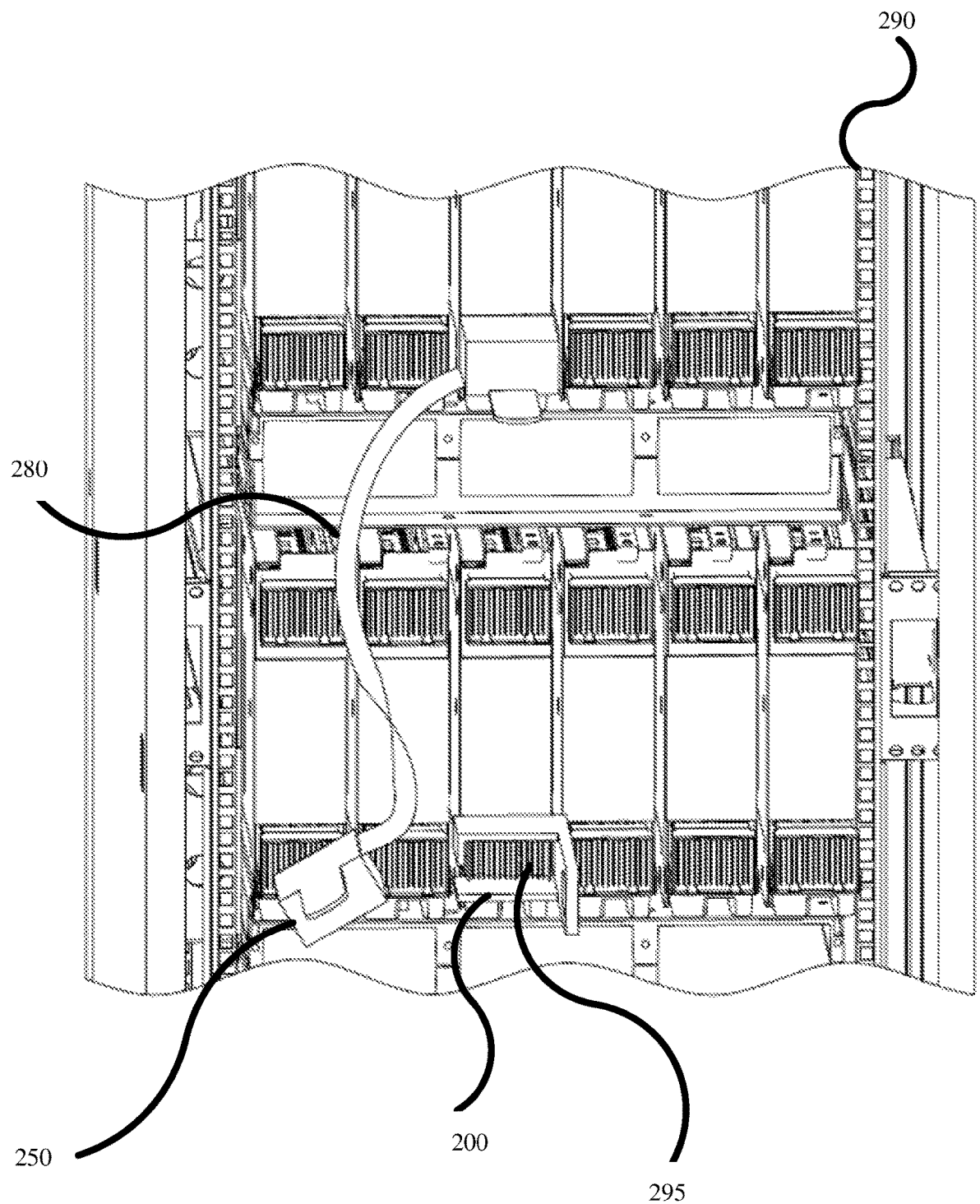
FIG. 2A illustrates an example placement of a fixture aligner on a computer.

Referring to FIG. 2A, fixture aligner 200 designed to accommodate connector 250 and a cord 280, is placed on the back of computer 290 around a port 295. In some embodiments fixture aligner 200 is held in place by a handle (such as handle 105). In some embodiments, fixture aligner 200 is capable of being visually inspected to ensure that it is aligned with port 295. In some embodiments, fixture aligner 200 may be designed to fit in or along a feature of port 295 or around port 295. For example, if there is a grove on computer 290 above port 295, fixture aligner 200 may be designed such that a part of fixture aligner 200 fits inside of the groove. In some embodiments, a of fixture aligner 200 may be designed with alignment features. For example, if computer 290 has holes or notches near port 295, fixture aligner 200 may have pins or pegs designed to fit inside the holes or notches.

In some embodiments, an adhesive may be applied at one or more contact points of fixture aligner 200. For example, a small amount of non-permanent adhesive may be applied to an edge of fixture aligner 200 that is designed to be placed against computer 290. In some embodiments, no adhesive may be applied to fixture aligner 200.

In some embodiments, an orientation marker may be placed on the fixture aligner to facilitate orientation during placement of the fixture aligner. For example, a mark may be placed on fixture aligner 200 to indicate which direction is up.

Figure 2B:
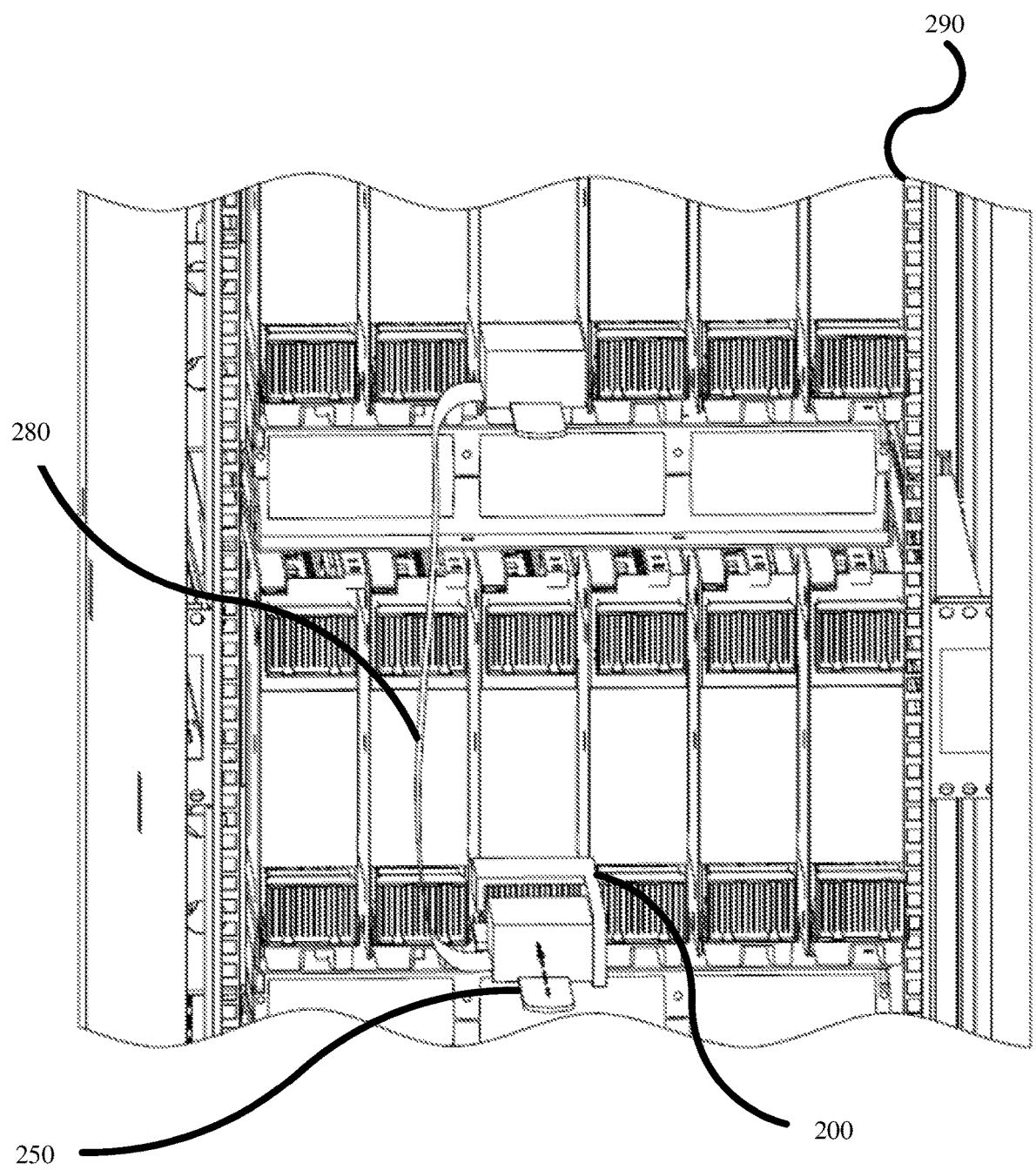
FIG. 2B illustrates an example placement of a fixture aligner on a computer with a connector being inserted.

Referring to FIG. 2B, in some embodiments, once fixture aligner 200 is positioned on the back of computer 290, connector 250 is inserted into fixture aligner 200. The alignment of fixture aligner 200 helps to facilitate the alignment of connector 250 with port 295 (not shown in FIG. 2B because it is covered by connector 250). In some embodiments, fixture aligner 200 has a slit (such as slit 111) to accommodate cord 280. For example, cord 280 is depicted as a ribbon cable and fixture aligner 200 is designed to fit around cord 280 without impeding or obstructing the engagement (e.g., plug in or connect) or disengagement (e.g., unplug or disconnect) of connector 250. In some embodiments, the handle of fixture aligner 200 may be held during the insertion of connector 250.

Figure 2C:
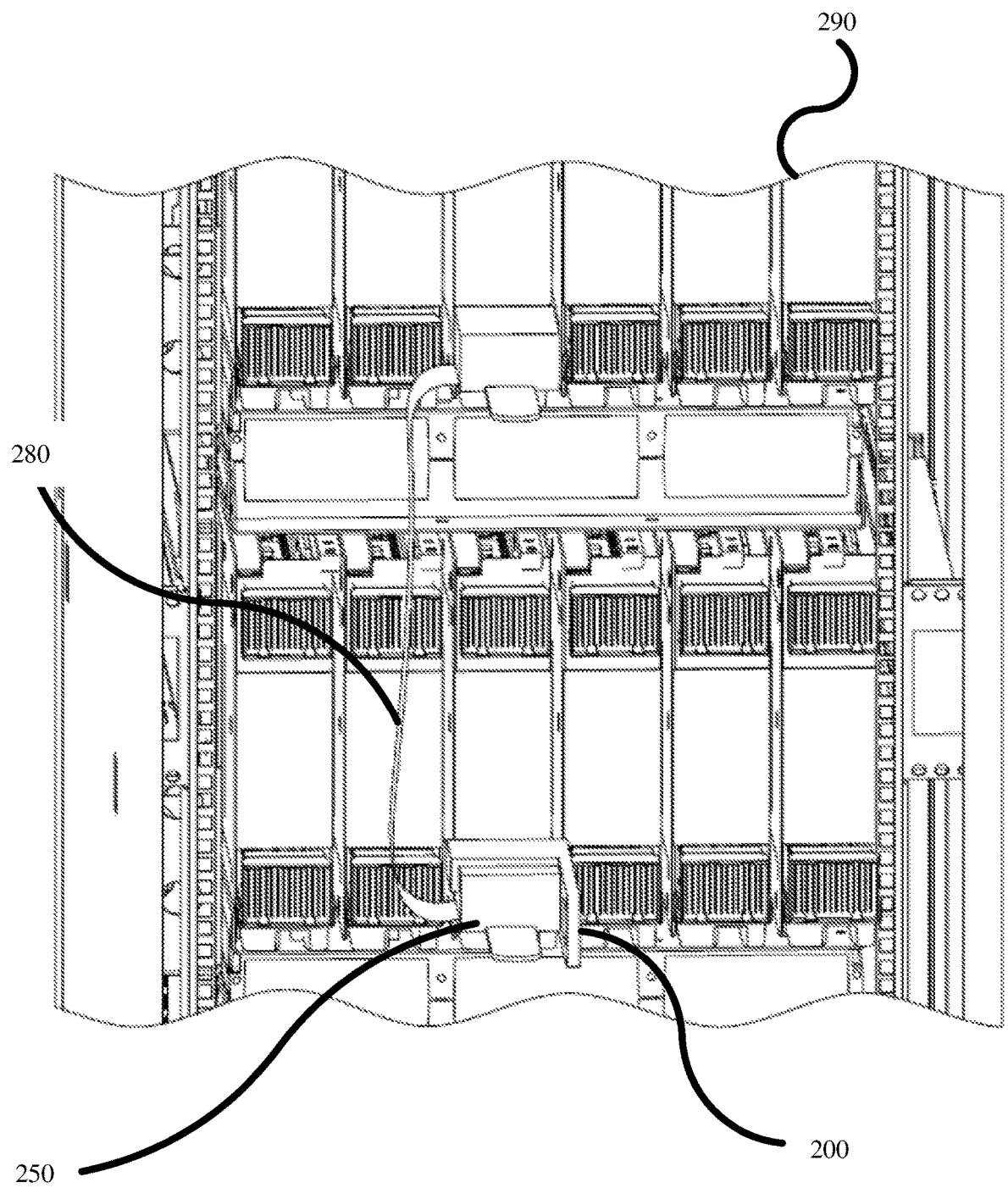
FIG. 2C illustrates an example placement of a fixture aligner on a computer after a connector has been engaged.

Referring to FIG. 2C, a connector 250 is positioned in fixture aligner 200 and engaged into port 295 (not shown in FIG. 2C because it is covered by connector 250). Fixture aligner 200 may help to safeguard against connector 250 being connected to or disconnected from a port at an improper angle or rotated such that the connector and/or port are damaged. In some embodiments, fixture aligner 200 may be designed to flex around connector 250. For example, fixture aligner 200 may be made out of a flexible material and made slightly smaller than connector 250 such that fixture aligner 200 flexes around connector 250 when connector 250 is inserted into fixture aligner 200. In some embodiments, fixture aligner 200 may be removed by grasping the handle of fixture aligner 200.

In some embodiments, fixture aligner 200 may be removed after the action of engaging or disengaging connector 250. For example, after connector 250 is engaged, fixture aligner 200 may be pulled away from computer 290. Fixture aligner 200 may slide over connector 250 away from computer 290.

Figure 3A:
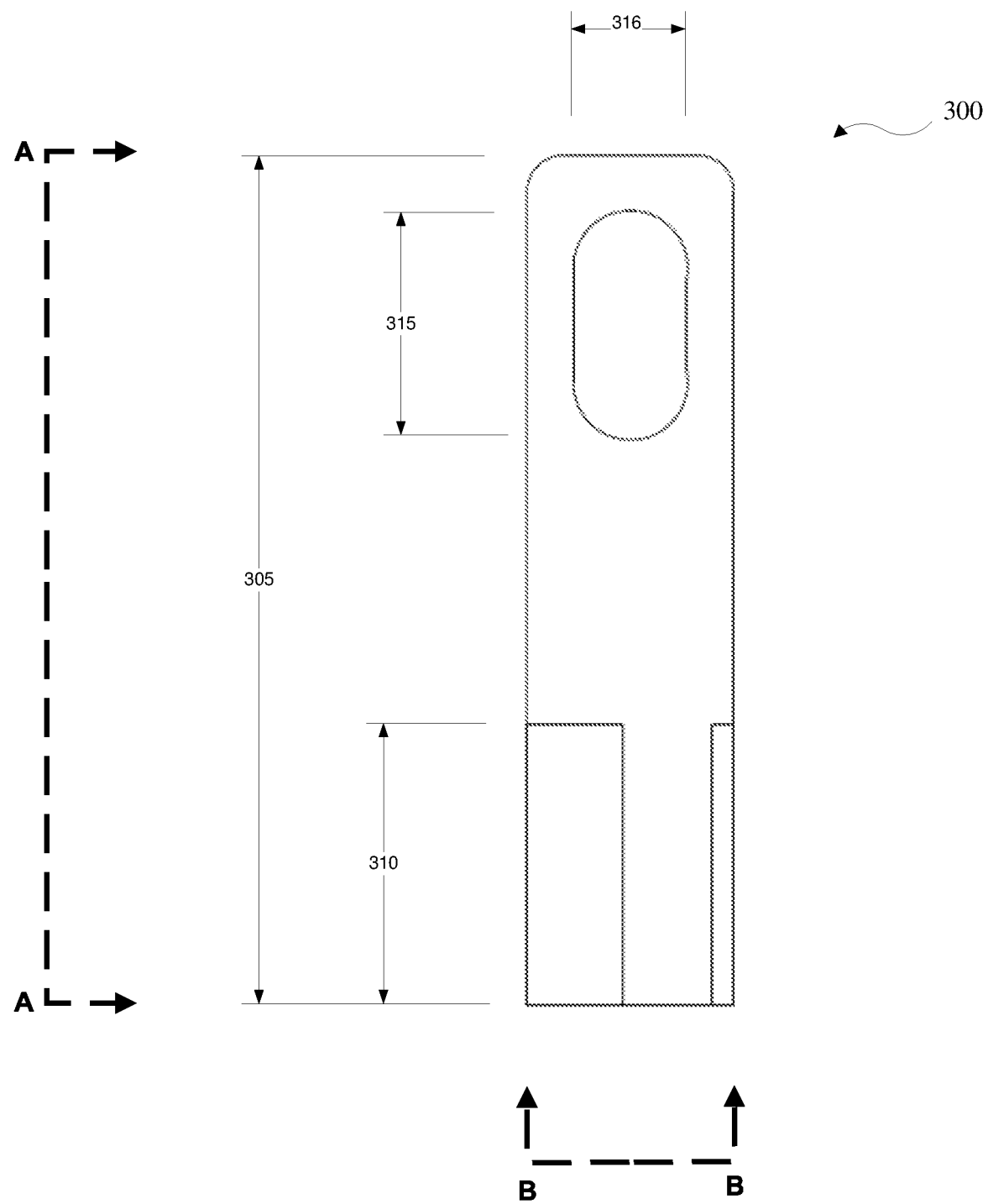
FIG. 3A illustrates an example fixture aligner.
Figure 3B:
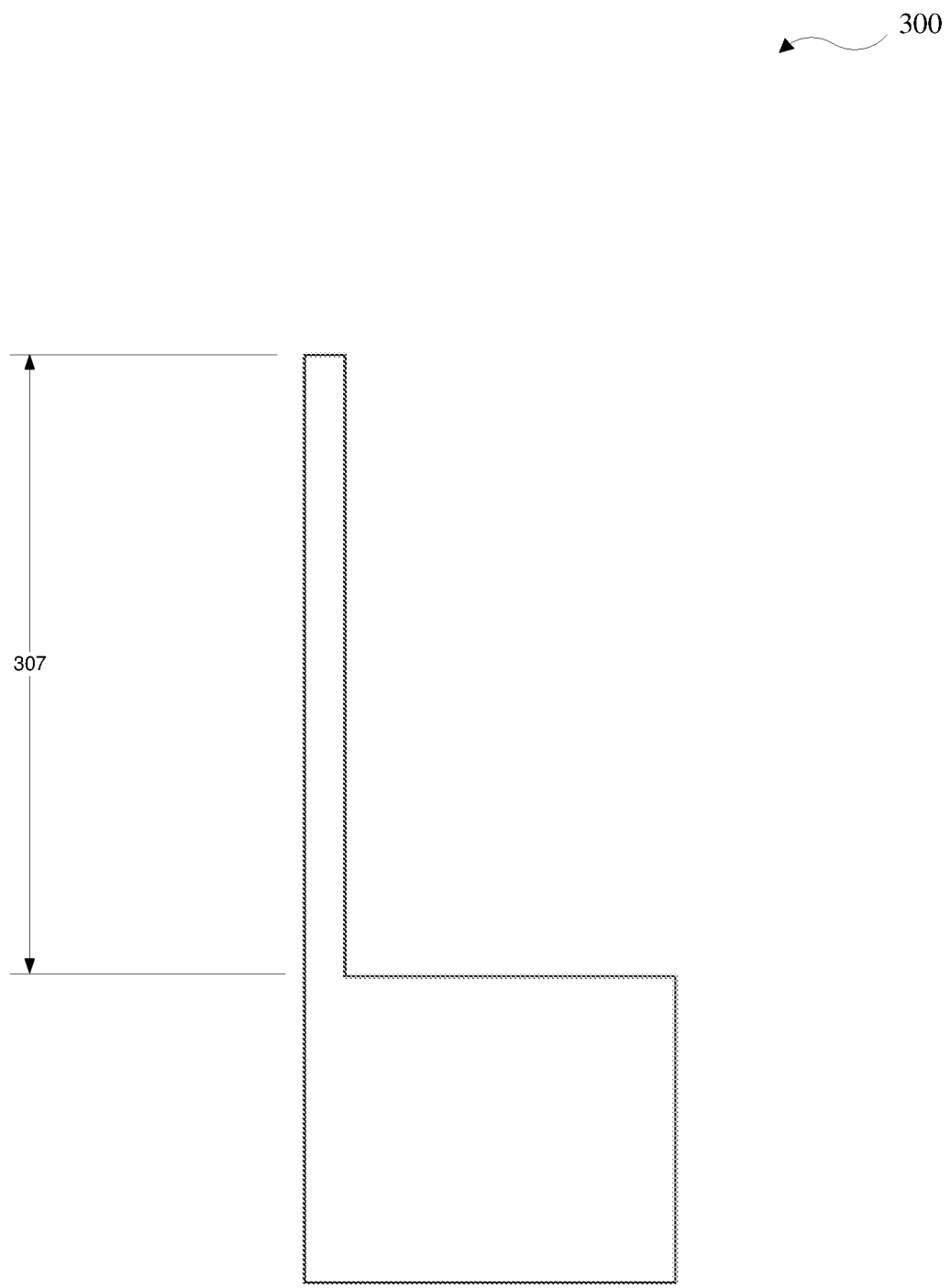
FIG. 3B illustrates an example fixture aligner.
Figure 3C:
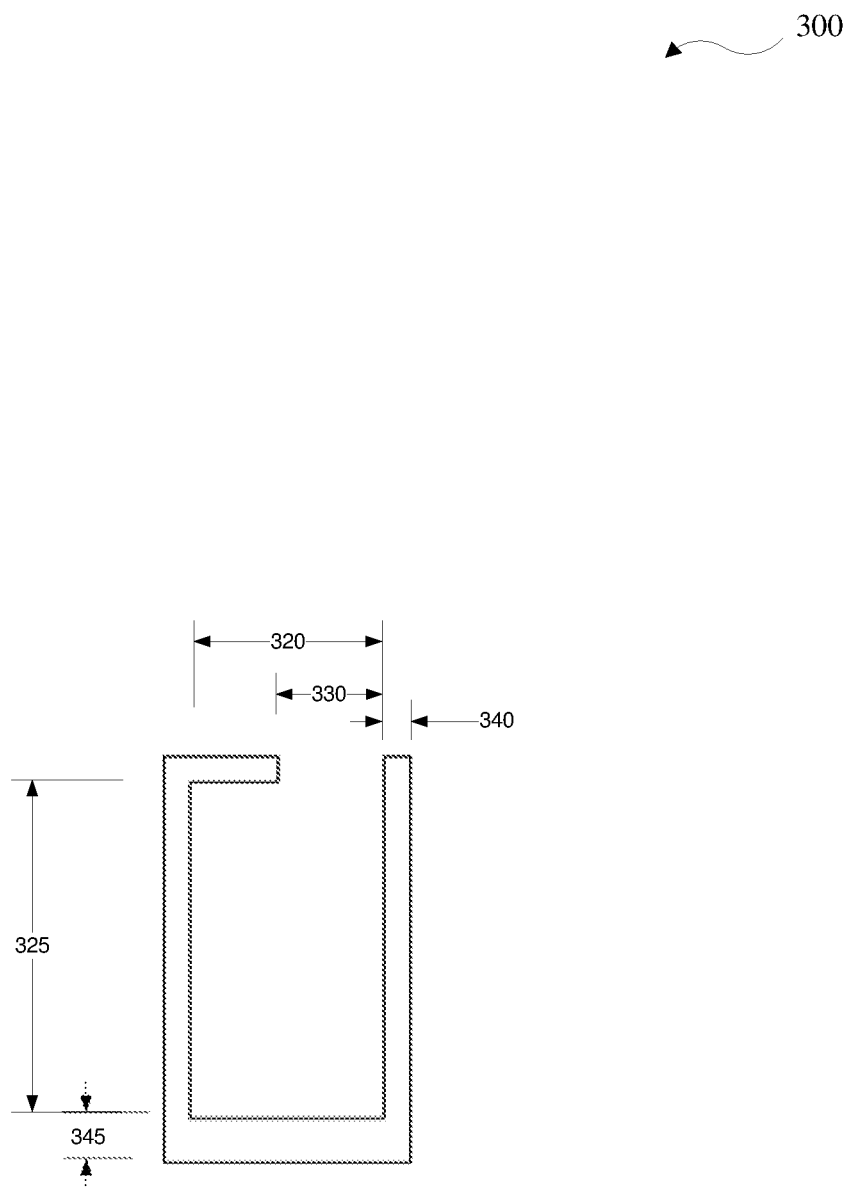
FIG. 3C illustrates an example fixture aligner.

An example fixture aligner 300 is depicted in FIGS. 3A, 3B, and 3C. FIG. 3B is a side view of fixture aligner 300 as viewed from A in FIG. 3A. FIG. 3C is a bottom view of fixture aligner 300 as viewed from B in FIG. 3A.

Referring to FIG. 3A, example fixture aligner 300 has an overall length 305 and a sleeve length 310. For example, overall length 305 may be approximately 115 mm+/−2 mm, and sleeve length 310 may be 38 mm+/−2 mm. In some embodiments, example fixture aligner 300 has a grip hole length 315 and a grip hole width of 316. For example, grip hole length may be 30 mm+/−2 mm and grip hole width may be 15.5 mm+/−2 mm.

Referring to FIG. 3B, example fixture aligner 300 has a handle length of 307. Handle length 307 can be varied according to a particular application's needs. For example, a fixture aligner in a densely packed system with many wires may need a longer handle to avoid entanglement with cords going to neighboring connectors. In some embodiments, the handle (or some sections of the handle) may be thicker to facilitate grasping by a hand, or to increase the structural integrity of the handle. For example, a section of the handle near the sleeve may be twice the thickness of the rest of the handle.

Referring to FIG. 3C, example fixture aligner 300 has an internal cavity body depth 325, an internal cavity body width 320, a slit width 330, a side wall thicknesses 340, and a back wall thickness 345. In some embodiments, internal cavity depth 325 and internal cavity width 320 may be designed to accommodate a specific connector. For example, internal cavity depth 325 may be 38 mm+/−2 mm and internal cavity width 320 may be 21 mm+/−2 mm to accommodate a connector that has a depth of approximately 27 mm and a width of approximately 20 mm.

In some embodiments, wall thicknesses of fixture aligner 300 may vary. For example, a back wall thickness 345 may be thicker than side wall thickness 340 to add more rigidity to the portion of fixture aligner 300 that connects to a handle (such as handle 105). For example, back wall thickness 345 may be 4.9 mm+/−0.5 mm and side wall thickness 340 may be 2.95 mm+/−0.5 mm. In some embodiments, the wall thickness of fixture aligner 300 may be varied to address structural demands. For example, parts of fixture aligner 300 that are prone to cracking may be made thicker and parts that are not prone to cracking may be made thinner.

In some embodiments, a slit width 330 may be designed to allow a cord, such as cord 280, to slide through slit width 330 during use of fixture aligner 300. For example, slit width 330 may be 8 mm+/−1 mm to accommodate a cord with a thickness of up to 7 mm.

In some embodiments, dimensions are designed according to structural needs (e.g., strength, modulus, etc.), fabrication considerations (e.g., moldability, assembly, etc.), and/or cost considerations. The dimensions, angles, orientations, configurations, and other interrelationships shown in FIG. 3A-3C are not to be taken in a limiting sense, and are not meant to be construed as necessarily replicating, or even approximating, the dimensions, angles, orientations, configurations, and other possible interrelationships that may be realized in a fixture aligner falling within the spirit and scope of the present disclosure.

Figure 4:
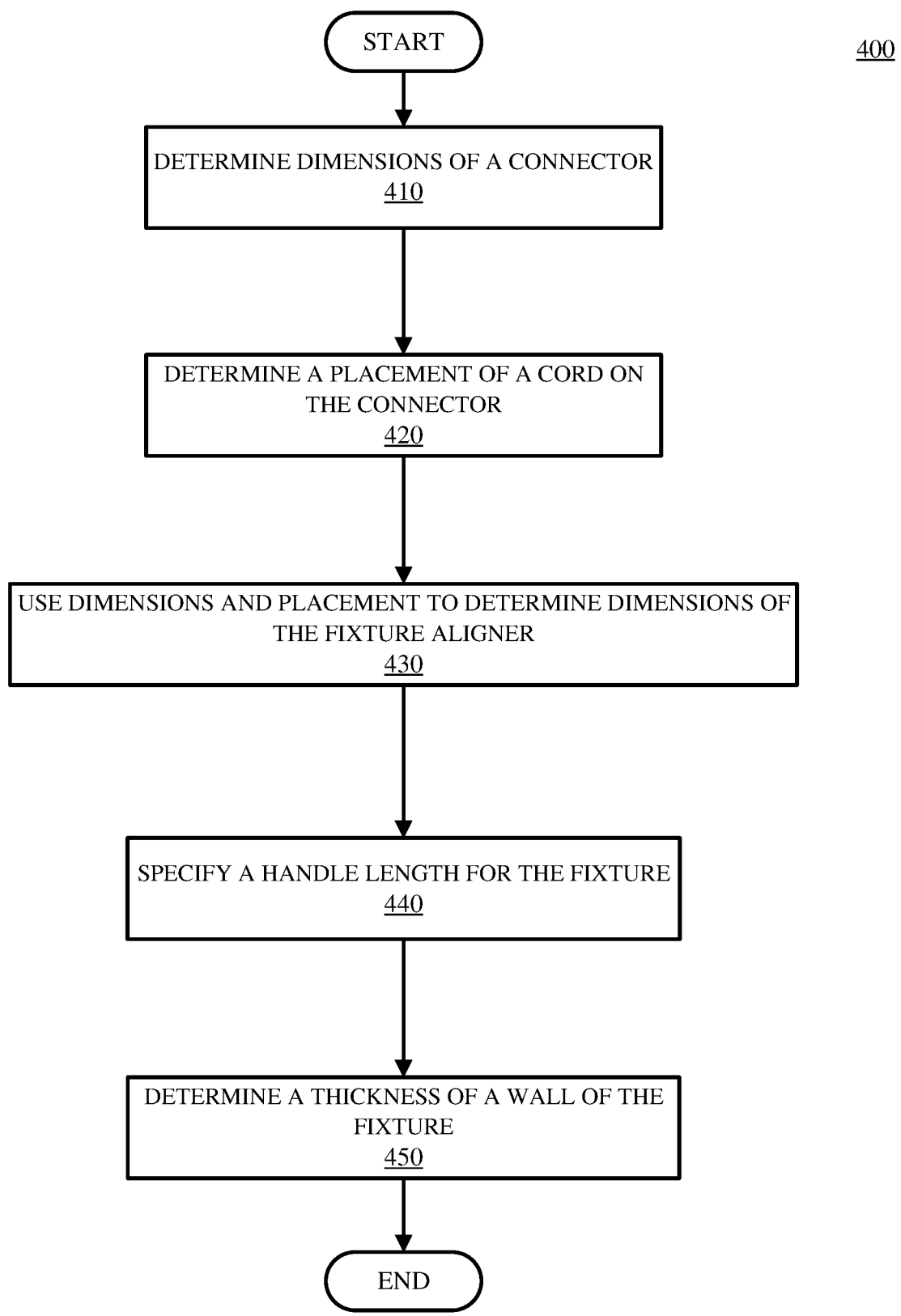
FIG. 4 illustrates an example method for designing a fixture aligner.

FIG. 4 illustrates a flowchart of an example method 400 of designing a fixture aligner. In method 400, the dimensions of a connector are determined at block 410. In some embodiments, the opening of a fixture aligner may be slightly larger (e.g., 1 mm in width and depth) than the connector it was designed for so the connector can slide freely through the fixture aligner.

At block 420 the placement of a cord on the connector and the size of the cord are determined. For example, the connector may have a cord coming off of a side of the connector (such as cord 280) or it may have a cord extending from a face opposite of the engagement portion of the connector.

At block 430, using the dimensions from block 410 and the cord placement form block 20, the dimensions of a sleeve of the fixture aligner are determined such that the fixture aligner accommodates the connector and cord. For example, slit width 330 from FIG. 3C may accommodate cord 280 from FIG. 2A.

In some embodiments, when the cord extends from the side of the fixture (such as cord 280 from FIG. 2A) the placement of a slit may accommodate the movement of the cord and therefore may need to be specifically placed on one wall of the fixture aligner. In some embodiments, when a cord extends from the face opposite of the engagement portion of the connector the slit may be placed in the most convenient or structurally sound place on the fixture aligner.

At block 440, a handle length for the fixture is specified. In some embodiments a longer handle (e.g., greater than 77 mm) may be needed to accommodate a densely packed area. In some embodiments, a shorter handle (e.g., less than 77 mm) may be needed to accommodate a tight working space.

At block 450, a thickness of each part of the fixture is determined. In some embodiments, the wall thickness may be uniform throughout the part. In some embodiments, the handles, or the region around a handle sleeve interface may be thicker. In some embodiments, specific regions of the sleeve may be designed to be thinner to allow the sleeve to flex around a connector. For example, where the entire sleeve is made out of the same material, thinner regions may have less rigidity and therefor may allow the sleeve to bend more in the thinner regions than the thicker regions.

Figure 5:
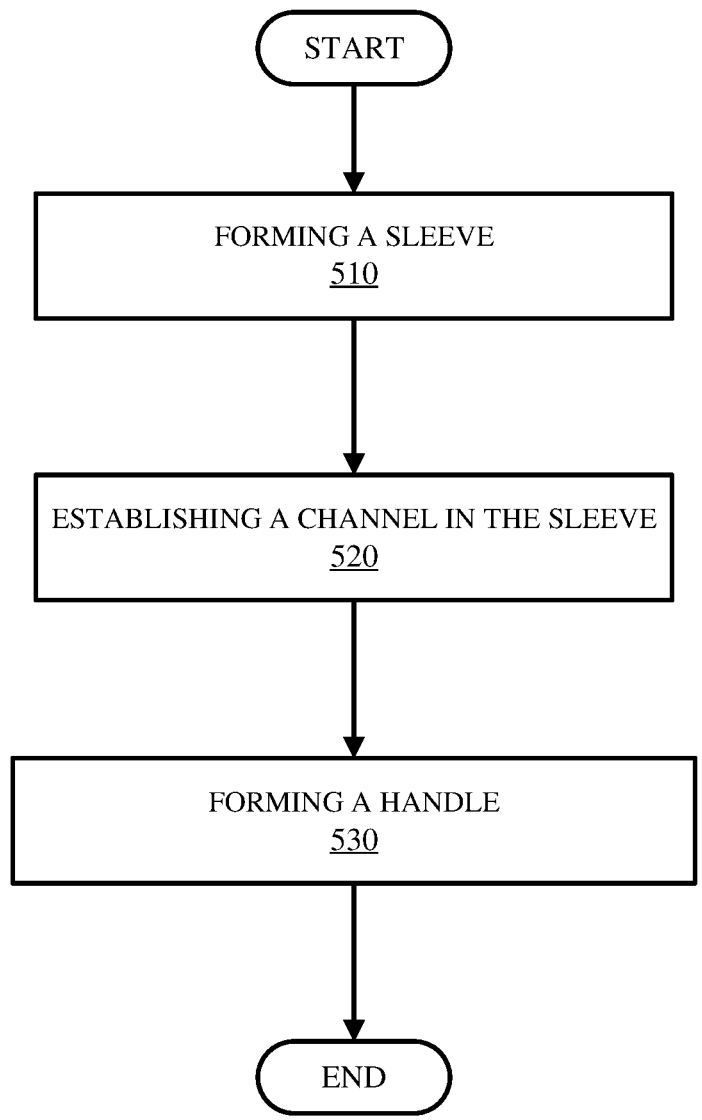
FIG. 5 illustrates an example method for making a fixture aligner.

FIG. 5 illustrates a flowchart of an example method 500 of producing a fixture aligner. In method 500, a sleeve is formed at block 510. In some embodiments, the sleeve contains a first opening at a first end (e.g., first end 115 in FIG. 1) of the sleeve and a second opening at the second end (e.g., second end 116 in FIG. 1) of the sleeve and the sleeve is designed to receive a cable connector. In some embodiments, the sleeve may be designed to receive a cable connector through the first end (while the sleeve is held at a port) and allow the cable connector to exit through the second end after the cable connector has been engaged to a port when the sleeve is pulled away from the port. In some embodiments, the sleeve is designed to be placed over a cable connector while the connector is engaged, where the sleeve contains first opening at a first end of the sleeve and a second opening at the second end of the sleeve. In some embodiments, the sleeve is designed to receive a cable connector through the second end while the connector is engaged and allow the cable connector to exit through the second end after the cable connector has been disengaged from a port.

At block 520, a channel is established in the sleeve extending a length of the sleeve from the first end to the second end, designed to allow for a cord attached to the cable connector to pass through the channel. For example, the sleeve could be formed without material in the region of the channel, or the sleeve could be formed with material in the cannel and the material could be removed forming the channel.

At block 530 a handle that extends from the first end of the sleeve is formed. In some embodiments, blocks 510, 520, and 530 may be performed simultaneously. In some embodiment, blocks 510, 520, and 530 may include forming parts separately and assembling the parts together. For example, a sleeve could be formed, a slit could be cut in the sleeve, and then a handle could be glued to the sleeve.

In some embodiments, the fixture aligner may be formed with a rapid prototyping technique such as stereolithography and/or 3D printing. Rapid prototyping is a group of techniques used to quickly fabricate a physical part or assembly using three-dimensional computer aided design. Construction of the part or assembly may be performed using 3D printing or "additive layer manufacturing" technology.

In some embodiments, the fixture aligner may be formed of a plastic, metal, carbon fiber, and/or composite material. For example, the fixture aligner may be formed using plastic injection molding, rotational molding, extrusion blow molding, injection blow molding, reaction injection molding, vacuum casting, thermoforming, and/or compression molding, among other techniques. For example, a metal part may be fabricated using a metal sampling and folding technique. For example, a carbon fiber part could be fabricated using a carbon fiber laminate over a mold.

Figure 6:
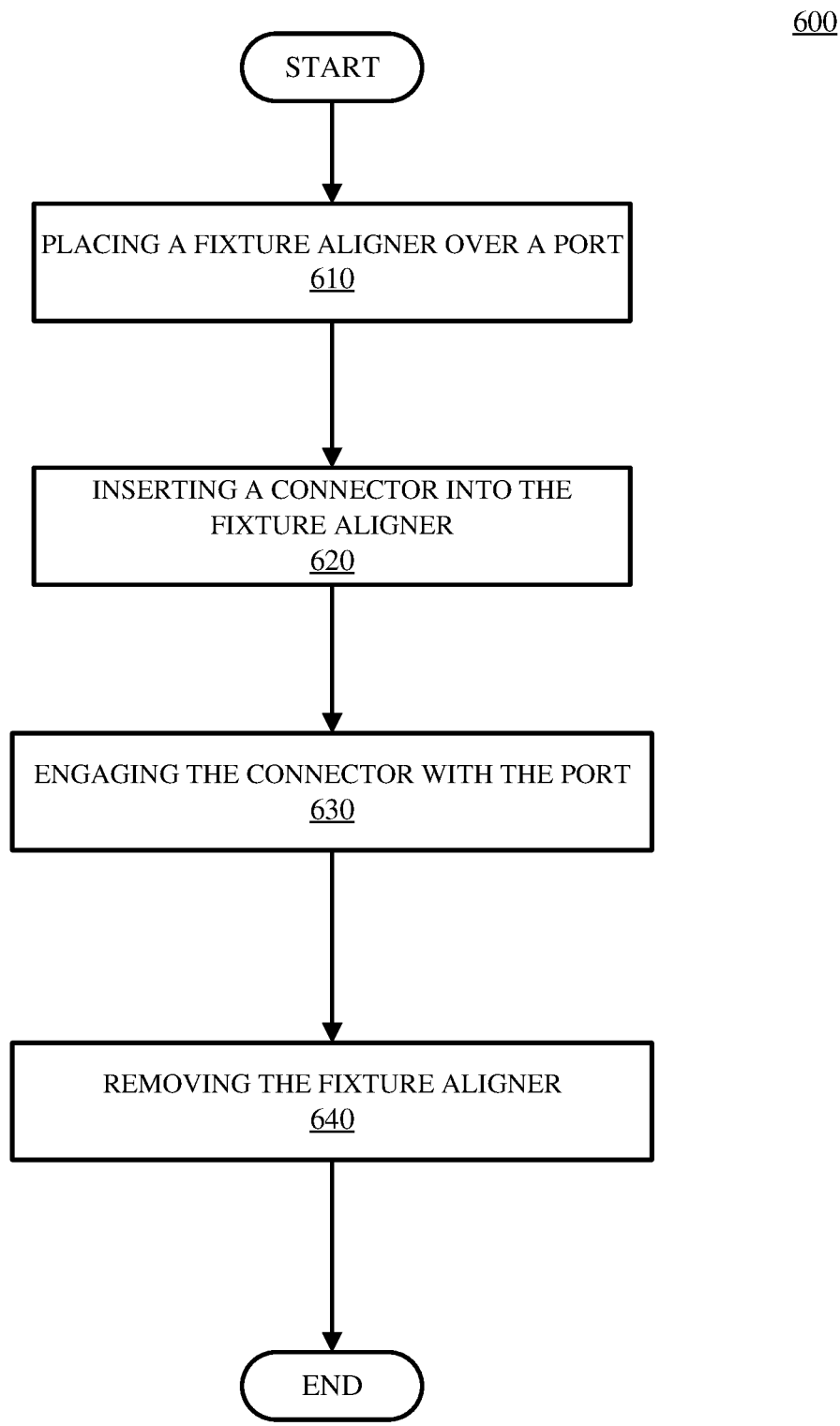
FIG. 6 illustrates an example method for using a fixture aligner to engage a connector.

FIG. 6 illustrates a flowchart of an example method 600 of using a fixture aligner to engage a connector. In method 600, the fixture aligner is placed around a port at block 610. In some embodiments, the fixture aligner may be visually inspected during the placement. In some embodiments, the fixture aligner is placed on the surface containing the port. The fixture aligner is designed to accommodate a cable connected to the connector.

In block 620 a connector may be inserted into the fixture aligner. In some embodiments, the connector may be aligned with the fixture aligner such that the cord is oriented towards a slit on the fixture aligner.

In block 630, the connector may be engaged with the port. In some embodiments, the connector may be slid through a sleeve of the fixture aligner to engage the connector with the port.

In block 640, the fixture aligner may be slid off of the connector away from the port. In some embodiments, the cord may slide through the slit on the fixture aligner.

Figure 7:
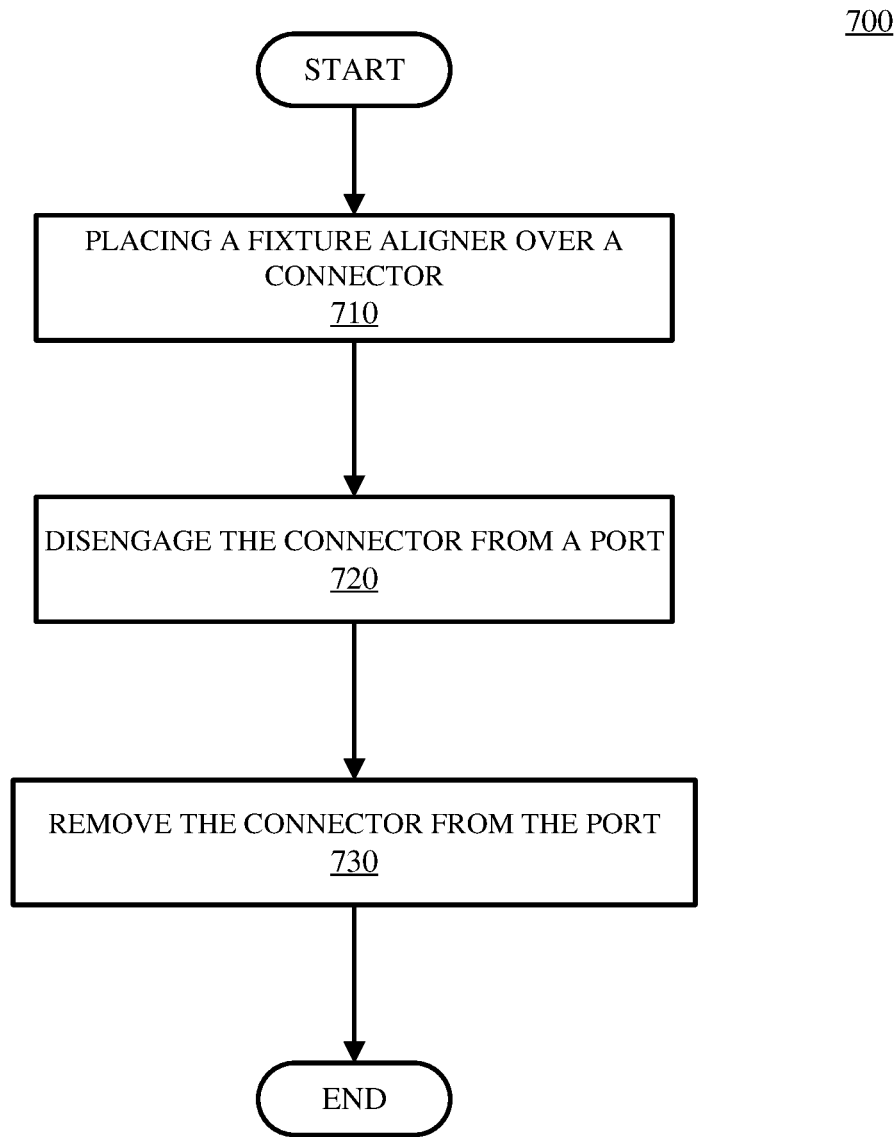
FIG. 7 illustrates an example method for using a fixture aligner to disengage a connector.

FIG. 7 illustrates a flowchart of an example method 700 of using a fixture aligner to disengage a connector. In method 700, the fixture aligner is placed around a connector at block 710, where the connector is engaged to a port. In some embodiments, the fixture aligner may be visually inspected during the placement. In some embodiments, the fixture aligner is designed to accommodate a cable connected to the connector.

In block 720, the connector may be disengaged from the port. In some embodiments, the connector may be pulled by a tab attached to the connector in order to disengage the connector from the port.

In block 730 the connector may be removed from the port. In some embodiments, the connector may be slid through a sleeve of the fixture aligner to remove the connector from the fixture aligner. In some embodiments, once the connector is disengaged from the port, the fixture aligner and the connector may be removed in unison. In some embodiments, the cord may slide through the slit on the fixture aligner.

The descriptions of the various embodiments of the present disclosure have been presented for purposes of illustration but are not intended to be exhaustive or limited to the embodiments disclosed. Many modifications and variations may be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An apparatus comprising:
   a sleeve configured to receive and hold a cable connector;
   a first opening at a first end of the sleeve;
   a second opening at a second end of the sleeve,
      wherein the sleeve is designed to receive the cable connector through the first end and allow the cable connector to exit through the second end after the cable connector has been engaged to a port;
   a channel in a wall of the sleeve extending a length of the sleeve from the first end to the second end, designed to allow for a cord attached to the cable connector to pass through the channel; and
   a handle extending from the first end of the sleeve.

2. The apparatus of claim 1 further comprising, a grip augmentation feature on the handle.

3. The apparatus of claim 1, wherein a wall thickness of the sleeve is varied.

4. The apparatus of claim 1, wherein the sleeve contains an alignment tab.

5. The apparatus of claim 1 wherein the sleeve is designed to flex around the cable connector.

6. The apparatus of claim 1, wherein the second end of the sleeve is coated with an adhesive.

7. The apparatus of claim 1, wherein an orientation marker is present on the sleeve.

8. A method comprising:
placing a fixture aligner over a port;
inserting a connector into the fixture aligner wherein the fixture aligner is configured to hold the cable connector, and wherein the fixture aligner has a slit in the wall of the sleeve designed to allow for a cord attached to the cable connector to pass through the slit;
engaging the connector with the port; and
sliding the fixture aligner off of the connector away from the port.

9. The method of claim 8, further comprising aligning the fixture aligner with the port.

10. The method of claim 9, further comprising holding the fixture aligner in alignment during the inserting and the engaging.

11. The method of claim 8, further comprising sliding a cord attached to the connector through the slit in the fixture aligner.

12. The method of claim 8, wherein the placing and the sliding are accomplished by holding a handle.

13. A method of producing a fixture connector, the method comprising:
forming a sleeve designed to hold a cable connector with a first opening at a first end of the sleeve and a second opening at a second end of the sleeve, the sleeve designed to receive the cable connector through the first end and allow the cable connector to exit through the second end after the cable connector has been engaged to a port;
establishing a channel in the wall of the sleeve extending a length of the sleeve from the first end to the second end, the channel designed to allow for a cord attached to the cable connector to pass through the channel; and
forming a handle that extends from the first end of the sleeve.

14. The method of claim 13, wherein the forming the sleeve comprises 3D printing the sleeve.

15. The method of claim 13, further comprising a grip augmentation feature on the handle.

16. The method of claim 13, wherein a wall thickness of the sleeve is varied.

17. The method of claim 13, wherein forming the sleeve further comprises forming an alignment tab on the sleeve.

18. The method of claim 13, wherein the sleeve is designed to flex around the cable connector.

19. The method of claim 13, wherein the second end of the sleeve is coated with an adhesive.

20. The method of claim 13, wherein forming the sleeve further comprises forming an orientation marker on the sleeve.

* * * * *